United States Patent
Kleber et al.

(10) Patent No.: US 8,091,203 B2
(45) Date of Patent: Jan. 10, 2012

(54) HIGH PRESSURE TANK AND METHOD THEREOF

(75) Inventors: Richard M. Kleber, Clarkston, MI (US); Hamid G. Kia, Bloomfield Hills, MI (US); John E. Carsley, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 12/275,487

(22) Filed: Nov. 21, 2008

(65) Prior Publication Data
US 2010/0126999 A1 May 27, 2010

(51) Int. Cl.
*B23P 11/02* (2006.01)
(52) U.S. Cl. ............... 29/447; 220/560.04; 220/588
(58) Field of Classification Search .......... 29/447; 228/176; 220/560.04, 561, 581, 582, 588, 220/586, 495.05
See application file for complete search history.

(56) References Cited

U.S. PATENT DOCUMENTS

| | | | | |
|---|---|---|---|---|
| 1,736,610 A * | 11/1929 | Löffler | ............... | 29/890.051 |
| 2,118,073 A * | 5/1938 | Dittmeyer | ............... | 138/96 R |
| 2,401,231 A * | 5/1946 | Crawford | ............... | 220/567.3 |
| 2,535,320 A * | 12/1950 | Richardson | ............... | 285/116 |
| 3,559,274 A * | 2/1971 | Granata | ............... | 228/127 |
| 3,740,839 A * | 6/1973 | Otte et al. | ............... | 29/830 |
| 4,759,110 A * | 7/1988 | Rieger et al. | ............... | 29/447 |
| 4,865,210 A * | 9/1989 | Brainard, II | ............... | 220/590 |
| 5,299,349 A * | 4/1994 | Seibig | ............... | 29/447 |
| 6,195,865 B1 * | 3/2001 | Kirik, Jr. | ............... | 29/447 |
| 6,260,858 B1 * | 7/2001 | DeLucia | ............... | 279/102 |
| 6,473,964 B1 * | 11/2002 | Anderson et al. | ............... | 29/888.1 |
| 6,595,528 B2 * | 7/2003 | Voss | ............... | 279/102 |
| 6,813,819 B2 * | 11/2004 | Siimes et al. | ............... | 29/447 |
| 7,169,214 B2 | 1/2007 | Kubo et al. | | |
| 7,770,278 B2 * | 8/2010 | Davies et al. | ............... | 29/447 |
| 2003/0226848 A1* | 12/2003 | Siimes et al. | ............... | 220/582 |
| 2004/0104235 A1* | 6/2004 | Sakaguchi et al. | ............... | 220/581 |
| 2004/0187287 A1* | 9/2004 | Davies et al. | ............... | 29/447 |
| 2007/0012551 A1 | 1/2007 | Rohwer et al. | | |
| 2008/0053554 A1* | 3/2008 | Salama | ............... | 138/172 |
| 2008/0209710 A1* | 9/2008 | Ferguson et al. | ............... | 29/447 |
| 2009/0139075 A1* | 6/2009 | Gey | ............... | 29/447 |

FOREIGN PATENT DOCUMENTS

CN 1148679 A 4/1997

* cited by examiner

*Primary Examiner* — David Bryant
*Assistant Examiner* — Christopher Koehler
(74) *Attorney, Agent, or Firm* — Reising Ethington P.C.

(57) ABSTRACT

One exemplary embodiment of a high pressure tank and a method thereof includes providing a liner of the high pressure tank. A liner having at least one open end with a first inner diameter and a first outer diameter. The method also including providing a cap having a second outer diameter which is greater than the first inner diameter. The method further includes providing a collar having a second inner diameter which is less than the first outer diameter. The liner is brought to a first temperature, the cap is brought to a second temperature which is less than the first temperature, and the collar is brought to a third temperature which is greater than the first temperature. At least a portion of the cap is placed inside the open end and at least a portion of the collar is placed over the open end.

6 Claims, 1 Drawing Sheet

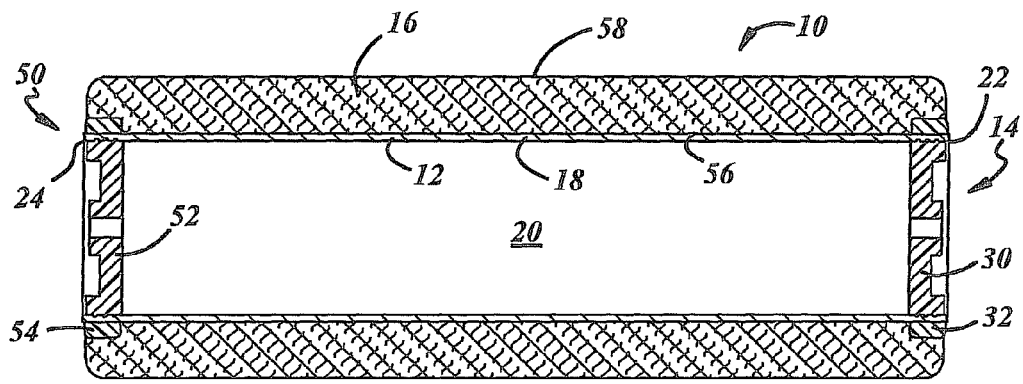
*FIG. 1*
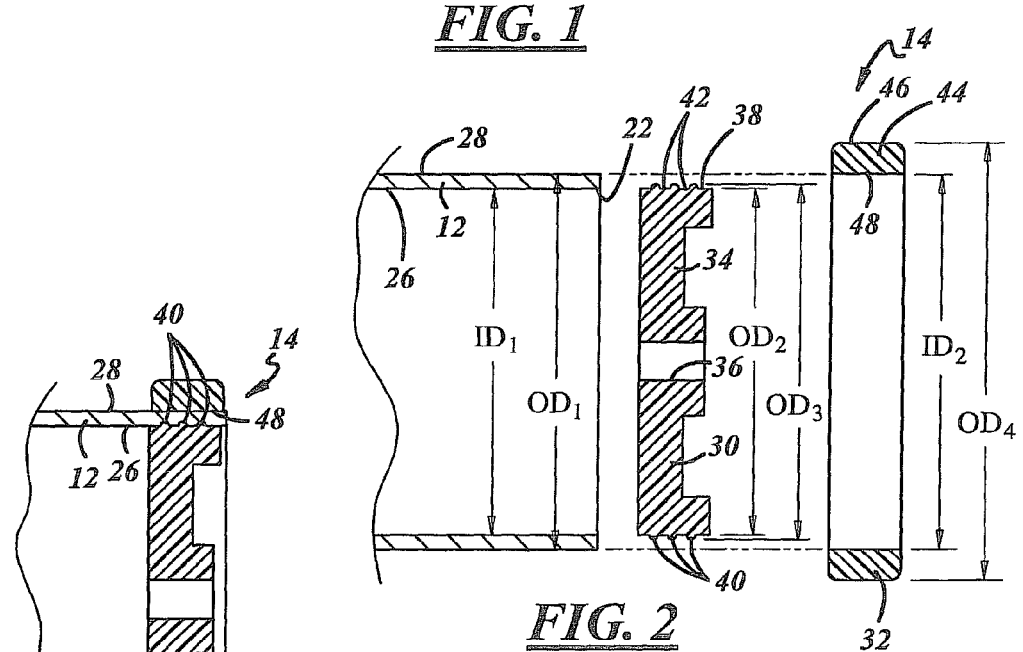
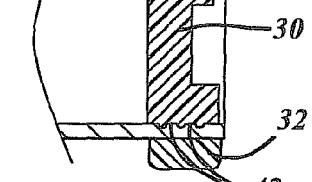
*FIG. 3*
*FIG. 2*
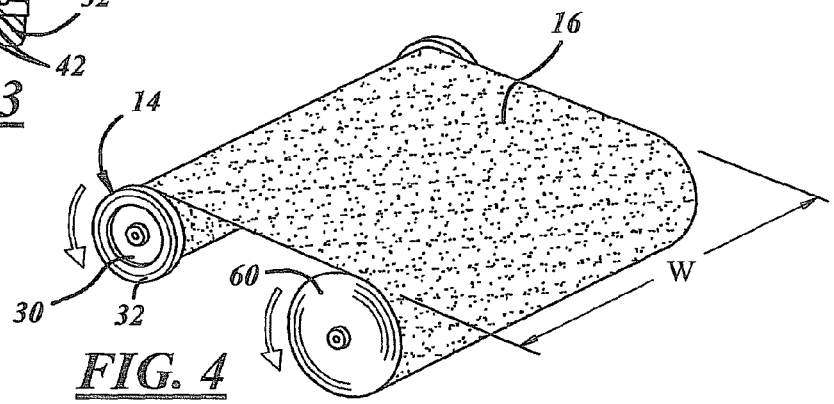
*FIG. 4*

HIGH PRESSURE TANK AND METHOD THEREOF

TECHNICAL FIELD

The field to which the disclosure generally relates includes high pressure tanks, and to methods of assembling high pressure tanks and of assembling ends thereof.

BACKGROUND

High pressure tanks are commonly used to store pressurized gasses and liquids, such as compressed hydrogen, for use in fuel cell vehicles like automobiles. The high pressure tanks can usually handle pressures ranging from vacuum to 10,000 psi and above. Cost and weight are just some of the challenges facing high pressure tanks.

SUMMARY OF EXEMPLARY EMBODIMENTS OF THE INVENTION

One exemplary embodiment includes a method which may include providing a liner of a high pressure tank. The liner having one or more open ends with a first inner diameter and a first outer diameter. The method may also include providing a cap having a second outer diameter which may be greater than the first inner diameter. The method may further include providing a collar having a second inner diameter which may be less than the first outer diameter. The method may include bringing the liner to a first temperature, bringing the cap to a second temperature which may be less than the first temperature, and bringing the collar to a third temperature which may be greater than the first temperature. The method may also include placing a portion or more of the cap inside the open end while the liner is at or near the first temperature and while the cap is at or near the second temperature. The method may further include placing a portion or more of the collar over the open end while the liner is at or near the first temperature and while the collar is at or near the third temperature.

Another exemplary embodiment includes a method which may include forming a liner of a high pressure tank by an extrusion process. The liner may have a first open end and a second open end, and may have a substantially constant inner diameter extending from the first open to the second open end. The method may also include forming a cap. The method may further include forming a collar. The method may include placing a portion or more of the cap inside the first open end, and may include placing a portion or more of the collar over the first open end and over the cap. The method may further include winding a fiber layer over the liner and over the collar from the first open end to the second open end.

Another exemplary embodiment includes a product which itself may include a high pressure tank. The high pressure tank may include a liner, a cap, a collar, and a fiber layer. The liner may have a first open end and a second open end, and may have a substantially constant inner diameter extending from the first open end to the second open end. The cap may be located inside the first open end and may help seal the first open end. The cap may have one or more ribs extending around the cap, protruding from an outer surface of the cap, and abutting the liner when assembled. The collar may be located over the first open end and over the cap to help seal the first open end. And the fiber layer may be located over the liner and over the collar.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 is a sectional view of an exemplary embodiment of a high pressure tank.

FIG. 2 is an exploded view of an exemplary embodiment of an end assembly that may be used with the high pressure tank of FIG. 1.

FIG. 3 is a sectional view of the end assembly of FIG. 2, showing the end assembly assembled.

FIG. 4 is a perspective view of an exemplary embodiment of a fiber layer winding process.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate an exemplary embodiment of a high pressure tank 10 that may be used to store fluids like liquids and pressurized gasses, such as, but not limited to, compressed hydrogen, for use in a fuel cell vehicle like an automobile. The high pressure tank 10 is designed to reduce manufacturing and assembly costs while maintaining structural integrity and a suitable weight. In one embodiment, the high pressure tank 10 may include a liner 12, an end assembly 14, and a fiber layer 16.

As an aside, and as used herein, the terms axially, radially, and circumferentially refer to directions relative to the generally cylindrical shape of the high pressure tank 10, so that the radial direction extends generally along any one of the imaginary radii of the cylindrical shape, the axial direction is generally parallel to a center axis of the cylindrical shape, and the circumferential direction extends generally along any one of the imaginary circumferences of the cylindrical shape.

The liner 12, also called an armature, may serve as a gas and liquid permeation barrier and as a core structural component of the high pressure tank 10. Referring to FIGS. 1 and 2, the liner 12 may have a generally cylindrical shape. In select embodiments, the liner 12 may be made out of an aluminum, an aluminum alloy, or other suitable material, and may be made by an extrusion process to have a fixed cross-sectional profile throughout its length. Other forming processes may be used in combination with or instead of the extrusion process, including machining processes. The liner 12 may have a body 18 defining an interior space 20 that holds the stored fluid. The body 18 may extend axially from a first open end 22 to a second open end 24. The liner 12 may also have a first inner surface 26 that may contact the stored fluid, and may have a first outer surface 28. The fixed cross-sectional profile defines a first inner diameter $ID_1$ that may be constant throughout the axial extend of the liner 12, so that the measured inner diameter taken at the first and second open ends 22, 24 may be the same as the measured inner diameter taken at about an axial midpoint of the liner. A first outer diameter $OD_1$ may also have a constant value throughout the axial extend of the liner 12.

The end assembly 14 may seal the ends of the high pressure tank 10 against fluid leakage and against exerted forces generated from the stored fluid, if so generated. The end assembly 14 may close the first open end 22, the second open end 24, or both open ends. Where only one open end is closed by the end assembly 14, another end structure may function as an inlet and/or an outlet for the high pressure tank 10 and may close the other end. Additionally or instead, the end assembly 14 may itself incorporate the inlet and/or outlet functions for the high pressure tank 10. Referring to FIG. 2, the end assembly 14 may include a cap 30 and a collar 32.

The cap 30 may be placed telescopically inside the first open end 22 to help seal the first open end. The cap 30 may be inserted entirely within the first open end 22 (see FIG. 3), or may be inserted only partly within the first open end. Referring to FIG. 2, the cap 30 may have a generally disc shape. In select embodiments, the cap 30 may be made out of an aluminum, an aluminum alloy, or other suitable material, and may be made by a casting process, a forging process, or another forming process that may be used in combination with or instead of the casting and forging processes, including machining processes. The cap 30 may have a body 34 which may define a fitting 36 (shown as an opening) used to install an inlet and/or outlet structure such as a valve, or the body may have a solid one-piece structure without the fitting. The cap 30 may also have a second outer surface 38 which may define a second outer diameter OD2. The second outer diameter OD2 may have a slightly greater value than the first inner diameter ID1 of the liner 12. One or more multiple ribs 40 may protrude radially from the second outer surface 38 and may extend circumferentially around the second outer surface. In one embodiment, a single rib may span the entire second outer surface 38, and may thus constitute the outer surface of the cap 30. In the embodiment shown, three ribs 40 are axially offset from one another and form spaces 42 between neighboring ribs. Each rib 40 may define a third outer diameter OD3 which may have a slightly greater value than the first inner diameter ID1. In the case where the cap 30 has the ribs 40, the second outer diameter OD2, may have a slightly lesser value than the first inner diameter ID1, while the third outer diameter OD3 is still slightly greater in value than the first inner diameter ID1. The exact dimensions of the cap 30 including the axial thickness, may be dictated by, among other things, the expected forces generated by the stored fluid, if so generated.

The collar 32 may be placed telescopically over the first open end 22 to help seal the first open end, and may serve as a pressure ring. The collar 32 may be inserted entirely over the first open end 22 (see FIG. 3), or may be inserted only partly over the first open end. Referring to FIG. 2, the collar 32 may have a generally ring shape. In select embodiments, the collar 32 may be made out of an aluminum, an aluminum alloy, or other suitable material, and may be made by an extrusion process, a forging process, or another forming process that may be used in combination with or instead of the extrusion and forging processes, including machining processes. The collar 32 may have a solid one-piece body 44 with a third outer surface 46 and a second inner surface 48. The third outer and second inner surfaces 46, 48 may define planar surfaces in the axial direction when viewed in cross-section. The third outer surface 46 may define a fourth outer diameter $OD_4$, and the second inner surface 48 may define a second inner diameter $ID_2$ which may have a slightly lesser value than the first outer diameter $OD_1$ of the liner 12. The exact dimensions of the collar 32, including the radial width and the axial thickness, may be dictated by, among other things, the dimensions of the cap 30 and the expected forces generated by the stored fluid and generated by the cap upon assembly.

As mentioned, a second end assembly 50 may close the second open end 24. Referring to FIG. 1, like the end assembly 14, the second end assembly 50 may include a second cap 52 and a second collar 54. The second cap 52 and the second collar 54 are similar to the cap 30 and the collar 32, including having the same respective inner and outer diameters, so that a detailed description will not be given here. Moreover, each of the end assemblies may include additional components that have not been shown or described.

The fiber layer 16 imparts internal pressure resistance to the high pressure tank 10, and imparts external damage resistance. The fiber layer 16 may include carbon fibers, glass fibers, or both, or another suitable composite fiber reinforced material. The fibers may be interwoven with one another and may include a bonding agent such as an epoxy resin. The fiber layer 16 may be in a pre-peg unidirectional sheet or roll-form. Moreover, the fiber layer 16 may include one or more layers, including, for example, an intermediate carbon fiber layer and an outer glass fiber layer. Referring to FIG. 1, the fiber layer 16 may have a third inner surface 56 and a fourth outer surface 58. The exact dimensions of the fiber layer, including the radial width, and the exact material used may be dictated by, among other things, the expected forces generated by the stored fluid, if so generated.

The high pressure tank 10 may be manufactured and assembled cost effectively. Once the separate components are formed, the end assembly 14 may be installed in the liner 12. In one embodiment, the liner 12, the cap 30, and the collar 32 may be brought to a desired temperature before being telescoped together. The exact temperature may depend on, among other things, the material used for the particular component, and the physical expansion or contraction needed for assembly. In one example, the liner 12 may be heated to a first temperature of about 200-250° C. so that the first inner diameter $ID_1$ and the first outer diameter $OD_1$ expand in size, or may be left at room temperature (e.g., 25° C. or another value). One example heating process is with an industrial continuous oven where the liner 12 would be carried on a conveyor, and another example is by induction heating. The cap 30 and the accompanying ribs 40 may be cooled to a second temperature below room temperature of about −20 to 10° C., or to about −196° C., so that the third outer diameter $OD_3$ of the ribs contracts to a size which is now less than the expanded first inner diameter $ID_1$. One example cooling process is with a cooling bath, such as a liquid nitrogen bath, as the case may be for the latter temperature example. And the collar 32 may be heated to an elevated third temperature of about 350-400° C. so that the second inner diameter $ID_2$ expands to a size greater than the expanded first outer diameter $OD_1$. Again, examples include the industrial continuous oven and the induction heating. In other embodiments, the first, second, and third temperatures may have other values.

While at the first, second, and third temperatures, the liner 12, cap 30, and collar 32 can be placed together. Of course, the various components need not be exactly at the first, second, and third temperatures, as the components may begin to change temperature once their particular process is completed; instead, the components may be near their respective temperatures. In one embodiment, a fixture (not shown) may hold and position the components as they are put in place. Because of the physical expansions and contraction, the liner 12, cap 30, and collar 32 may be slip-fit together without force and with little or no contact between the components, which may not otherwise be the case. The components may then all be brought to room temperature. In one example, the components are brought to the room temperature by conduction; that is, the cap 30 may conduct heat from the liner 12 and from the collar 32 while the components are at rest. The fixture may still hold and position the components while they are brought to room temperature, and then the fixture may be removed.

Once at room temperature, the various inner and outer diameters may return to their previous sizes. Referring to FIG. 3, the first outer surface 28 of the liner 12 may come into direct contact with, and may abut against, the second inner surface 48 of the collar 32. The collar 32 and the liner 12 may then exert opposing forces against each other. The outer surface of each rib 40 may come into direct contact with, and may abut against, the first inner surface 26 of the liner 12. The cap 30 and the liner 12 may then exert opposing forces against each other. The ribs 40 may be embedded in the liner 12 and may form a respective first, second, and third seal therebetween. The displaced material of the liner 12 may then fill the spaces 42, as the collar 32 may prevent the material from moving radially outwardly. As an option, a circumferential interface formed between the liner 12 and the cap 30 may be welded together to provide an additional seal and an additional way to keep the end assembly 14 installed in the liner. As a further option, a mechanical fastener may be used with the cap 30, collar 32, and/or liner 12 to provide an additional seal and an additional way to keep the end assembly 14 installed in the liner.

Once installed, the fiber layer 16 may be wound around the liner 12 and around the end assembly 14. Referring to FIG. 4, a roll 60 of fiber layer 16 may be unwound by a winding machine in a high speed process. The fiber layer 16 may be helically wound over the circumference of the liner 12 and over the collar 32. The third inner surface 56 of the fiber layer 16 may directly contact the first outer surface 28 of the liner 12, and may directly contact the third outer surface 46 of the collar 32. The fiber layer 16 on the roll 60 may have a pre-sized axial width W that is equal to the axial width of the liner 12 with the installed end assembly 14. After being wound, the fiber layer 16 may be cured to become permanently adhered to the liner 12 and to the end assembly 14. In one embodiment, an additional and a separate winding process need not be performed over the axially exposed end portion of the end assembly 14. In another embodiment, the additional and separate winding process may be performed.

The above description of embodiments of the invention is merely exemplary in nature and, thus, variations thereof are not to be regarded as a departure from the spirit and scope of the invention.

What is claimed is:

1. A method comprising:
   providing a liner comprising an alloy high pressure hydrogen gas storage tank, the liner having first and second open ends with a first inner diameter and a first outer diameter;
   providing alloy caps having an outer surface with multiple axially offset ribs with spaces therebetween, the spaces having a second outer diameter which is slightly less than the first inner diameter, the ribs having a third outer diameter slightly greater than the first inner diameter;
   providing alloy collars having a second inner diameter which is less than the first outer diameter;
   bringing the liner to a first temperature about 200-250° C., bringing the caps to a second temperature about −196 to 10° C., and bringing the collars to a third temperature about 350-400° C.;
   placing at least a portion of the caps inside the open ends while the liner is at or near the first temperature and while the caps are at or near the second temperature;
   placing at least a portion of the collars over the open ends while the liner is at or near the first temperature and while the collars are at or near the third temperature
   bringing the liner, the caps, and the collars to a room temperature which is less than the third temperature and which is greater than the second temperature;
   winding an interwoven pre-peg multiple layer unidirectional fiber sheet comprising a resin and having at least an intermediate carbon fiber layer and an outer glass fiber layer, the fiber sheet having a pre-sized axial width equal to an axial length of the liner and end assemblies comprising the installed caps and collars, the sheet having an inner surface contacting an outer surface of the liner and end assemblies; and
   curing the resin to permanently adhere the fiber sheet to the liner and to the end assemblies.

2. A method as set forth in claim 1 wherein the liner comprises an aluminum or an aluminum alloy, the cap comprises an aluminum or an aluminum alloy, and the collar comprises an aluminum or an aluminum alloy.

3. A method as set forth in claim 1 further comprising providing the liner by an extrusion process.

4. A method as set forth in claim 3 further comprising providing the cap by a casting or a forging process.

5. A method as set forth in claim 4 further comprising providing the collar by an extrusion or a forging process.

6. A method as set forth in claim 1 further comprising welding an interface formed between the liner and the cap.

* * * * *